United States Patent [19]

McSweeney et al.

[11] Patent Number: 5,416,649

[45] Date of Patent: May 16, 1995

[54] SINGLE CHANNEL METHOD AND APPARATUS FOR AUTOMATICALLY OPTIMIZING INSERT EDITING IN A SIGNAL RECORDER

[75] Inventors: William McSweeney, Saratoga; Robert B. Steele, Menlo Park, both of Calif.

[73] Assignee: Ampex Corporation, Redwood City, Calif.

[21] Appl. No.: 272,443

[22] Filed: Jul. 8, 1994

Related U.S. Application Data

[63] Continuation of Ser. No. 685,262, Apr. 12, 1991, abandoned.

[51] Int. Cl.$^6$ .............................................. G11B 5/584
[52] U.S. Cl. .............................. 360/77.13; 360/77.01; 360/13; 360/14.1
[58] Field of Search ............... 360/76, 77.12, 77.13, 360/13, 14.1, 14.2, 14.3, 64, 27, 67, 68, 46, 70, 77.01, 77.06, 77.13, 77.16

[56] References Cited

U.S. PATENT DOCUMENTS

| | | | |
|---|---|---|---|
| 4,151,570 | 4/1979 | Ravizza et al. | |
| 4,347,534 | 8/1982 | Kimura | 360/77.12 |
| 4,422,108 | 12/1983 | Sampei et al. | |
| 4,486,796 | 12/1984 | Sakamoto | 360/77.13 |
| 4,488,185 | 12/1984 | Toba | |
| 4,504,870 | 3/1985 | Kitamura et al. | |
| 4,520,410 | 5/1985 | Sekiguchi et al. | 360/77.13 |
| 4,602,298 | 7/1986 | Nishitani et al. | 360/14.1 |
| 4,689,706 | 8/1987 | O'Gwynn | 360/14.1 |
| 4,745,496 | 5/1988 | O'Gwynn | 360/70 |
| 4,901,166 | 2/1990 | Kojima | 360/77.13 |
| 4,977,469 | 12/1990 | Yokozawa | 360/13 |
| 5,077,623 | 12/1991 | McSweeney | 360/27 |
| 5,107,381 | 4/1992 | Mitsuhashi et al. | 360/77.13 |
| 5,130,859 | 7/1992 | Seki et al. | 360/14.1 |

FOREIGN PATENT DOCUMENTS

| | | |
|---|---|---|
| 094207 | 11/1983 | European Pat. Off. |
| 0095766 | 12/1983 | European Pat. Off. |
| 0299542 | 1/1989 | European Pat. Off. |
| 55-25876 | 2/1980 | Japan |
| 60-079550 | 5/1985 | Japan |
| 61-284853 | 12/1986 | Japan |
| 1010409 | 1/1989 | Japan |
| WO87/06048 | 10/1987 | WIPO |

OTHER PUBLICATIONS

Azuma et al, "Microprocessor Controlled Variable Play-back Speed System for Video Tape Recorder" IEEE Transactions on Consumer Electronics, vol. CE-26, No. 1, pp. 121-128 Feb. 1980.

VPR-300 Series, Video Production Recorder Service Manual, vol. II, Catalog #1520528-02 (Aug., 1989) pp. 6-192-6-199.

*Primary Examiner*—Georgia Y. Epps
*Assistant Examiner*—P. W. Huber
*Attorney, Agent, or Firm*—John G. Mesaros; George B. Almeida

[57] ABSTRACT

A single channel circuit and method for the automatic edit optimization of a recording medium which is operable with a recorder such as a video tape recorder or a disc recorder utilizes the difference between signal outputs from an automatic scan tracking playback head and a record, head to provide a difference signal indicative of the rf amplitude fluctuations caused by scene or data pattern variations of the data stored on the recording medium. A correction signal corresponding to the difference signal is stored, and used as a feedback signal to normalize the gain of a variable gain amplifier. The single channel is switched at a predetermined rate between circuitry coupled to the automatic scan tracking playback head and circuitry coupled to the record head in order to obtain rf amplitude samples from both heads to develop the correction signal. Thereby, the correction signal allows a precise edit optimize so that a subsequent edit operation such as an insert edit can be precisely performed.

21 Claims, 6 Drawing Sheets

SINGLE CHANNEL METHOD AND APPARATUS FOR AUTOMATICALLY OPTIMIZING INSERT EDITING IN A SIGNAL RECORDER

This is a continuation of application Ser. No. 07/685,262, filed Apr. 12, 1991, now abandoned.

CROSS REFERENCE TO RELATED APPLICATION

This application is related to an application Ser. No. 07/684,628, filed Apr. 12, 1991 by Ross Michael Thomas and Colin MacLean Jensen, entitled TWO CHANNEL METHOD AND APPARATUS FOR AUTOMATICALLY OPTIMIZING INSERT EDITING IN A SIGNAL RECORDER assigned to the same assignee, and filed concurrently with this application.

BACKGROUND OF THE INVENTION

1. Field of the Invention

This invention relates to editing information stored in a data file and, more particularly, to automatically optimizing the positioning of a record head while using an information storage medium such as a magnetic tape recorder in editing a magnetic tape or a disc recorder in editing a disc store.

2. Description of Related Art

In editing information such as video signals or audio signals or almost any other signal stored in some storage media such as on a magnetic tape, a function known as "edit optimization" has typically been performed during the editing session.

It is known that edit optimization includes manually adjusting an edit recording machine so as to provide longitudinal tracking and rotating scanner phase, which match that of the tape, which is to be edited. Tracking, for example, of a helical record head, typically allows for the subsequent longitudinal adjustment or alignment of the tape to match the helical position of the record head. Edit optimization is typically performed prior to the actual editing function and is typically useful to set up, or to initialize, or to synchronize, or to align the various elements of an edit recording machine including the storage medium so that an "optimized" edit does occur. For example, edit optimization is usually required when making "interchange edits," which are edits of a storage medium such as tape, which has been recorded by one recorder, which is different than a second recorder being used for the edit session. That is, in an interchange edit, the storage medium was written using a first machine but is being edited using a second machine.

In a typical edit optimize, longitudinal tracking is varied across the storage medium such as a magnetic tape in order to obtain a peak radio frequency (rf) amplitude signal from a record head during a playback. Note that, in an edit optimize, it is typical that a record head serves two functions, i.e. in one function, the record head is used to write information on the storage medium while, in the second function, the record head is used to read information from the storage medium. A direct current (dc) voltage representing the rf amplitude level is generally supplied to a control system, which, in turn, varies the tracking across the tape by way of a suitably programmed microprocessor within the control system until a value corresponding to the maximum rf level is detected and stored in the microprocessor. More particularly, it is known that the microprocessor monitors the rf amplitude while varying a reference signal supplied to the conventional control track circuit of the tape recorder. When the microprocessor detects the peak rf amplitude, the microprocessor stores the reference signal as a digital value corresponding to the control track position. This stored value is thereafter used to provide proper tracking.

In recent state-of-the-art digital video tape recorders such as the VPR ® 300, which is a D2 composite digital format video tape recorder manufactured by Ampex Corporation, the edit optimization procedure may be facilitated by various features provided in, for example, an "edit optimize menu" which includes the necessary machine control and display indications to a human operator which allow automatic adjustments of the required parameters to perform the edit optimization.

A subtle problem with known edit optimization procedures relates to the fact that record heads need to be positioned over the tracks that are already recorded on the magnetic tape. Therefore, as newly written tracks are written over old tracks that are already recorded on the magnetic tape, an edge of the previously recorded track will typically be trimmed during the edit process when overwriting the previously recorded track. In that manner, the track is made with an improper width. However, if an edit optimization process uses the center of the track as a reference, it can align the newly recorded material with the previously recorded material.

Further, proper tracking during the editing process may not be possible due to variations in the data content of the signals already recorded on the storage medium, whether the data content be video or analog or otherwise or whether the data content be digital or analog or otherwise. The variations in the data content cause frequency variations commensurate with the different data patterns which make up the recorded data which, in turn, affects the rf amplitude of the signals on the storage medium. Such an effect is generally known by the term "pattern sensitivity." In particular, variations in frequency cause variations in the rf amplitudes due to the nature of a digital recording, particularly when using a code that changes its frequency spectrum as, for example, does a Miller-squared code. Thus a data pattern, which is recorded on a storage medium at different frequencies, will likely be played back at different rf amplitudes. It is worth pointing out that the effect of pattern sensitivity exists in analog recording as well as in digital recording, although to a much lesser extent in analog recording.

As earlier mentioned, data content variations such as typically related to changes in the scenery in the television art, cause problems in the peaking of the tracking due to fluctuations in the rf amplitude reproduced from a recording of the scenery on a magnetic tape in a video tape recorder. That is, these fluctuations are often caused not only by mistracking with the playback head but also by the variations in the data content of the recording. It follows then that, when performing, for example, an edit optimize, the pattern sensitivity can cause misleading information to be generated and the misleading information can affect the peak rf amplitude measurement. Since proper tracking is assumed upon detecting a peak rf amplitude, if the pattern sensitivity causes misleading information to be generated, then an improper alignment of a track may be signaled during an edit optimize. If an insert edit is thereafter undertaken with such an improper alignment from the edit optimize, then the insert edit could result in a poor quality and a visually unacceptable edit when the result is later viewed on a television monitor. Thus, pattern sensitivity in a digital recording, such as a recording using, for example, Miller-squared encoding or any code that changes its frequency content, will be played back with some rf amplitude variations because of the change in frequency. For example, assume a data pattern is recorded on tape at a frequency of 30 megahertz (MHz) and assume the same data pattern is recorded on tape at a frequency of 10 MHz. Upon playback, the 30 MHz frequency signal will likely have a lower rf amplitude than will the 10 MHz frequency signal due to the usual losses that occur with increased frequency.

SUMMARY OF THE INVENTION

These and other problems are solved in accordance with the principles of the present invention, which includes a method and apparatus for, among other things, differentiating, during an automatic edit optimizing process, between rf amplitude fluctuations due to mistracking and rf amplitude fluctuations due to variations in frequency caused by data pattern variations. More particularly, the method and apparatus concern a technique for distinguishing the rf amplitude fluctuations caused by pattern sensitivity from the remaining rf amplitude fluctuations that truly are caused by tracking alone, to thereby allow proper tracking when performing a subsequent edit.

To this end, when in an automatic edit optimize mode, an automatic scan tracking playback head of a video tape recorder can be used to playback a recording. Assume that an automatic scan tracking system is functioning. It is then known that the playback head is tracking properly. Therefore, on the one hand, any fluctuations in the rf amplitude output read by the playback head are not due to mistracking and, accordingly, on the other hand, such fluctuations in the rf amplitude output read by the playback head must be due to data variations, or to pattern sensitivity. These fluctuations are determined and correction values corresponding thereto are stored in a suitably programmed microprocessor. Thus, while a user operator of the method or apparatus is performing an edit optimization, the stored information derived from the rf amplitude fluctuations caused by pattern sensitivity alone, are applied as a predetermined correction feedback signal to normalize the record head playback output. Thereby, any fluctuations remaining in the record head playback output are tracking error signals which can be used in a conventional fashion to provide proper tracking. This allows the performance subsequently of a precise insert edit.

More particularly, an illustrative embodiment of the principles of our invention includes a switch which alternately supplies (a) the rf amplitude signals generated by the automatic scan tracking playback head to a peak level detector and then (b) rf signals from the record head to a peak level detector. Respective outputs from both the playback head and the record head are low pass filtered to spectrally match the record head rf signal. The peak level output from the peak detector is converted to a corresponding digital signal, which in turn is supplied to a suitably programmed microprocessor for storage in memory. The contents in memory are manipulated by the microprocessor which computes a "correction" signal corresponding to the difference between the playback head signal and the record head rf signal stored by the microprocessor. The correction signal is supplied by the microprocessor to vary the gain of a variable gain amplifier in the record head channel to eliminate the effects of pattern sensitivity. Therefore, the signal from the variable gain amplifier is due to tracking alone, and a precise amplitude peak is available responsive to which the record head can be correctly positioned during a subsequent editing process.

BRIEF DESCRIPTION OF THE DRAWING

These and other advantages of the present invention will become apparent from the following detailed description when taken in conjunction with the accompanying drawing in which.

DETAILED DESCRIPTION

Figure 1:
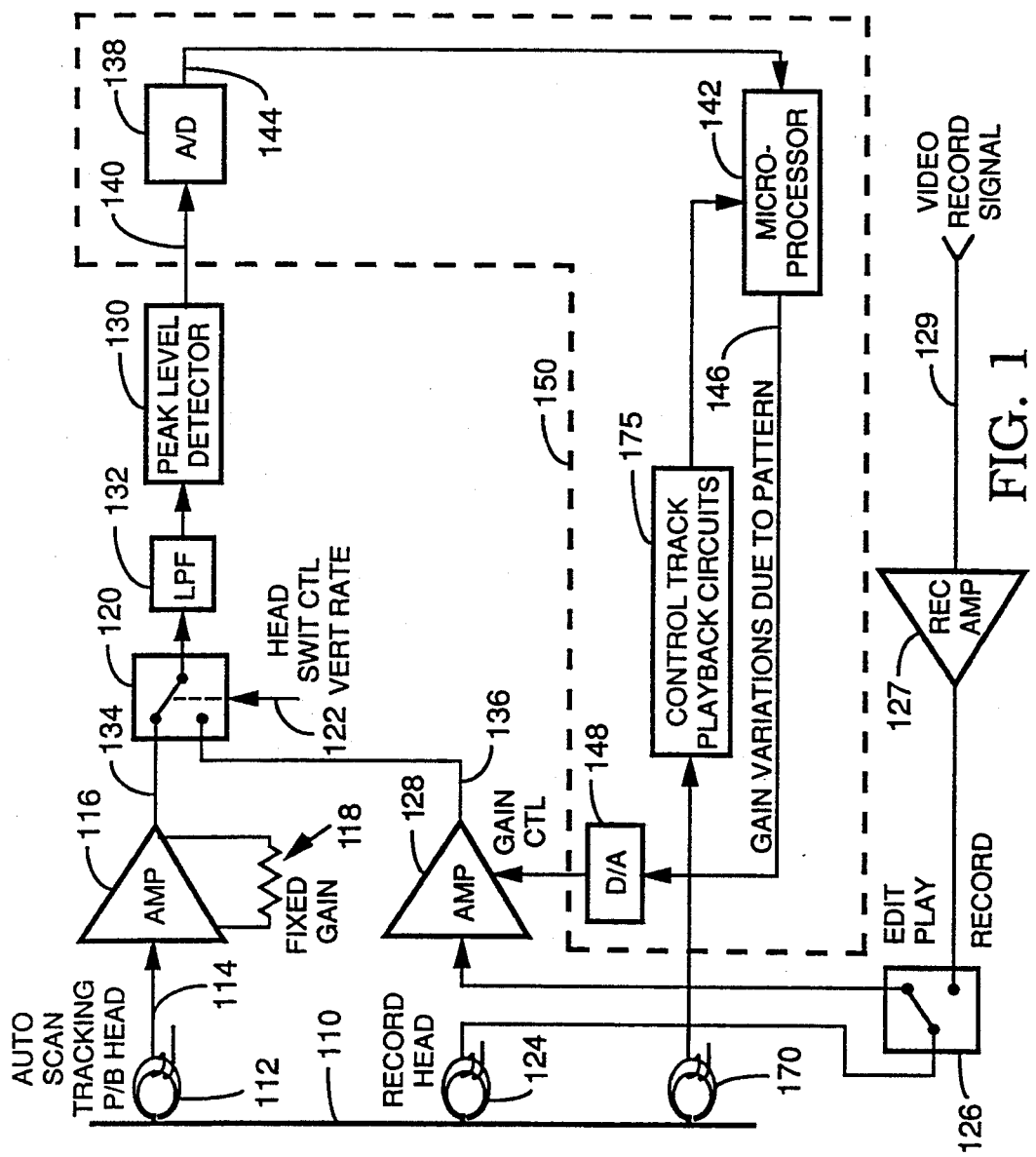
FIG. 1 is a block diagram depicting a single channel embodiment of circuitry for effecting the automatic edit optimize process of the invention.

The following description of the principles of our invention are in terms of a magnetic tape storage medium. That is by way of illustration only, and not by way of limitation. The principles of our invention apply equally well to a disc store medium or, for that matter, to any storage medium which stores data in a manner that, after reading and understanding the following detailed description of an illustrative embodiment of the principles of our invention, resembles a relatively straight or relatively curvilinear trace or track recording of stored information. Further, the principles of our invention are not limited to the kind of information stored on the storage medium or to the timing or sampling rates described. Although the illustrative embodiment is described in terms of video signals and audio signals being the subject of an edit optimization, that is also only by way of illustration, and not by way of limitation, for the information could be video signals, audio signals, both, or still another type of signal and further could be digital information, or analog information, or both, or still another form of information.

To prepare for an editing session, an edit operator, or user, of the edit optimization system and method to be described could mount the storage medium such as the magnetic tape to be edited onto any of a variety of recorders for that storage medium such as the VPR ® 300, which is a D2 composite digital format video tape recorder manufactured by Ampex Corporation, for a magnetic tape storage medium. Note that the D2 composite digital format is a well known video tape format. Note also that the tape recorder which is to be used in the edit session may be different than the tape recorder that was used to store the information on the tape to be edited, or even the temperature and humidity between recording time and edit time may be different, it being noted that there is an almost limitless number of variables which could have an effect on the edit optimization process, where the edit optimization process includes the process of locating the precise location of the information to be edited in the edit session. Note further that the edit optimization function occurs before, and typically in anticipation of, the actual edit function, for example, before an insert edit function. The edit optimization function can be thought of as involving a process of preparing or initializing the tape recorder in which the tape and heads are aligned and, using the principles of our invention, are automatically aligned so that an optimal edit function can thereafter take place.

A human operator could perform an edit optimization function, which until now has involved the manual adjustment of the longitudinal tracking of the edit recorder machine to match that of the tape to be edited. To help visualize some typical kind of adjustments that are part of the edit optimization function, refer now to FIGS. 4, 5 and 6, each of which illustrates a magnetic tape 400 with four D2 formatted helical video tracks 410-1, 410-2, 410-3 and 410-4 recorded thereon. Further, the well known D2 format also records four channels of digital audio information, which are labelled A1, A2, A3 and A4 and which are recorded at the ends of the helical video tracks 410-1, 410-2, 410-3 and 410-4. Each audio channel is actually recorded twice with identical data being written on the tape at alternate ends of adjacent video tracks to improve the protection of the written information against corrupted data caused, for example, by dropouts due to longitudinal scratching of the tape or format and interchange errors as well as to improve edit performance. Also, individual editing of the plurality of audio channels or the plurality of video channels is made easier by the D2 format including "edit gaps" such as gaps 420 or 421 between blocks of data stored on the individual tracks of the magnetic tape 400.

Figure 4:
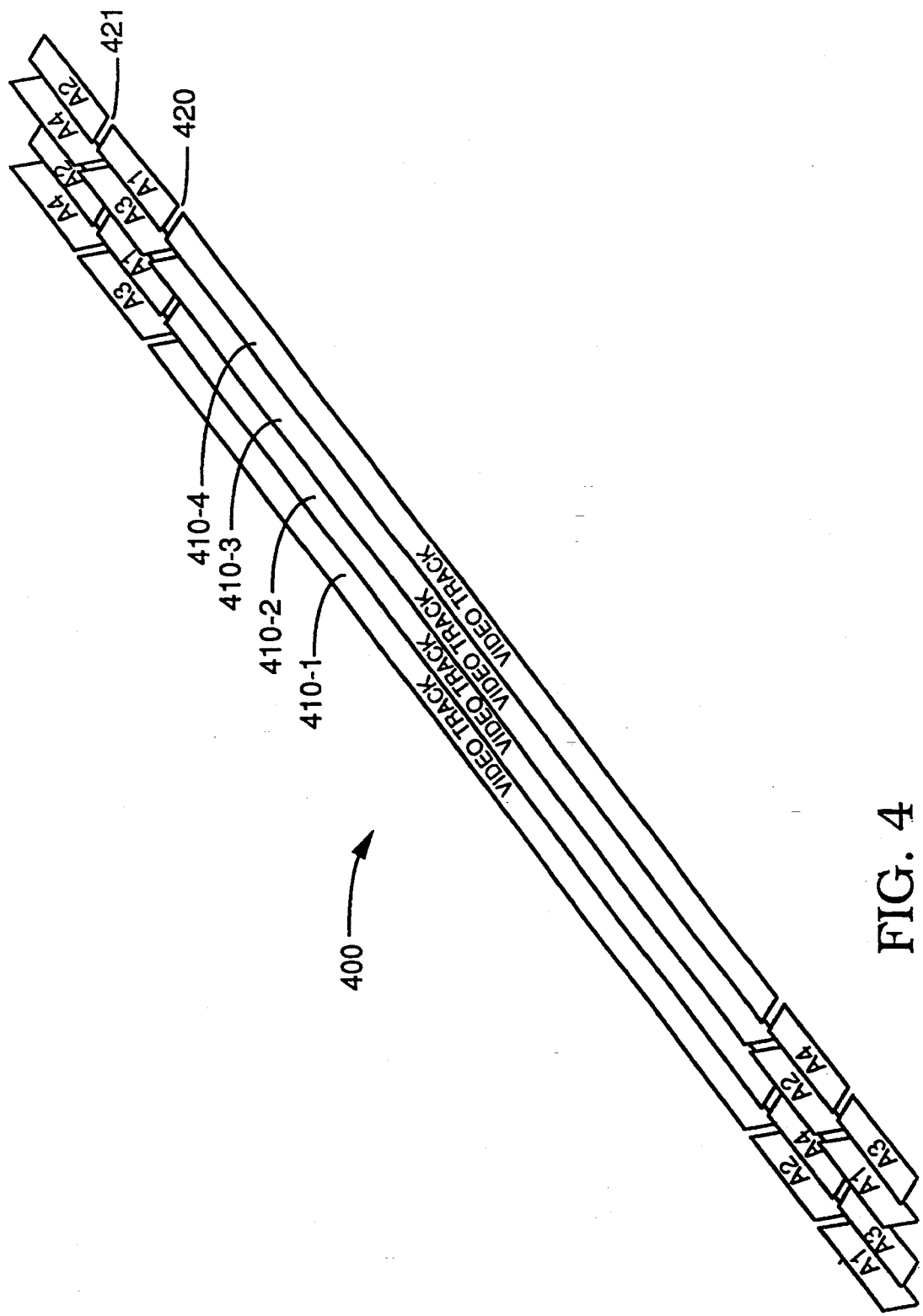
FIG. 4 illustrates a plurality of video tracks and audio channels, as ideally written on a magnetic tape, and is useful in illustrating the principles of our invention.

In the case of an insert edit in which only video is inserted, an ideally optimized magnetic tape would insert the new video track(s) in perfect alignment with respect to the audio channels such as is illustrated in FIG. 4. The ideal does not always exist so we can plan for a "misoptimized" magnetic tape. As one example of a misoptimized magnetic tape, consider a magnetic tape which could have inserted on it new, but mispositioned, video tracks such as mispositioned video tracks 540 shown in FIG. 5. Note that video tracks 540 are imperfectly aligned with respect to the audio channels also shown in FIG. 5. Note also that not only can newly inserted mispositioned video tracks 540 (versus ideally aligned tracks 410-3 and 410-4 shown in FIG. 4) be misaligned with respect to the audio channels A1, A2, A3 and A4 but the newly inserted mispositioned video tracks 540 may partially overwrite some of the audio channels A1, A2, A3 or A4. For example, observe closely at point 530 how the ends of mispositioned video tracks 540 are illustrated in FIG. 5 as overwriting some of audio channels A2 and A4.

Figure 6:
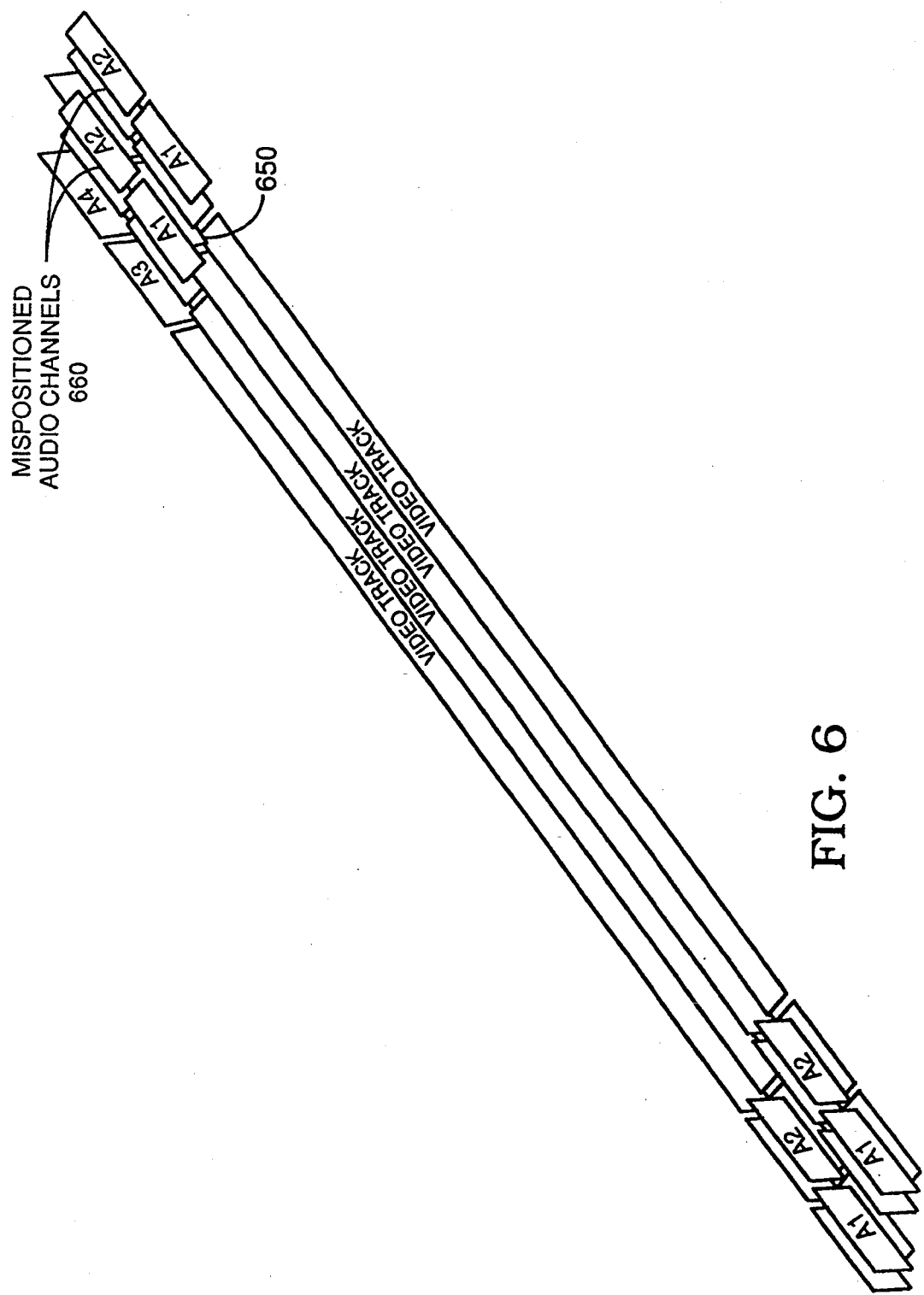
FIG. 6 illustrates a plurality of video tracks and audio channels, as written on a magnetic tape like in FIG. 4 except that some of the audio channels are misaligned, and is useful in illustrating the principles of our invention.

As another example of a misoptimized magnetic tape, consider a magnetic tape which could have inserted on it new, but mispositioned, audio channels such as mispositioned audio channels 660 shown in FIG. 6. Note that audio channels 660 are imperfectly aligned with respect to the video tracks also shown in FIG. 6. Note also that not only can newly inserted audio channels 660 (versus the ideally aligned audio channels A1, A2, A3 and A4 of FIG. 4) be misaligned with respect to the video tracks 410-1, 410-2, 410-3 and 410-4 but the newly inserted audio channels may partially overwrite some of the video tracks. For example, observe closely at point 650 how the ends of mispositioned audio channels 660 are illustrated in FIG. 6 as overwriting some of video track 410-3.

With the foregoing description as a foundation and now with an understanding of some of the problems related to edit optimization, we now turn to a more specific description of an illustrative embodiment of the principles of our invention. During an edit optimization and before performing an insert edit, the center of a previously recorded track on the tape to be edited is found by identifying amplitude variations of a first nature, e.g., by varying the location of the record head with respect to a track on the magnetic tape (also known as "tracking" in the art) and concurrently detecting a peak amplitude signal that is read, or played back, through the record head (also known as "peaking" in the art). However, as previously mentioned, playback rf signal amplitude changes of a second nature are also caused by changes in the frequency spectrum due to variations in the recorded data patterns. In accordance with the principles of our invention, amplitude variations of this second nature are identified and removed from the peak tracking amplitude computation. To this end, a detection is made of a playback rf output being provided from an automatic scan tracking playback head in order to derive a signal indicative of changes in the playback head output due only to data pattern variations. Prior to a playback rf output also being provided from a record head, the playback head rf amplitude is spectrally shaped to match it to that of the record head so that the difference signal is not affected by specific head properties and/or variations in characteristics such as head gap lengths. After detection of both rf signals with equal gain (note the gains need not be equal, but the equality condition is assumed here only to help illustrate the principles of our invention), the amplitude variation due to data pattern variations alone is computed, and a correction signal corresponding to the inverse of the variation is fed back to normalize the gain of the record head amplifier in the record channel. As a result, the signal that is derived from the record head amplifier is due to the effects of tracking alone and can be used to provide precise positioning of the record head prior to the edit.

Figure 5:
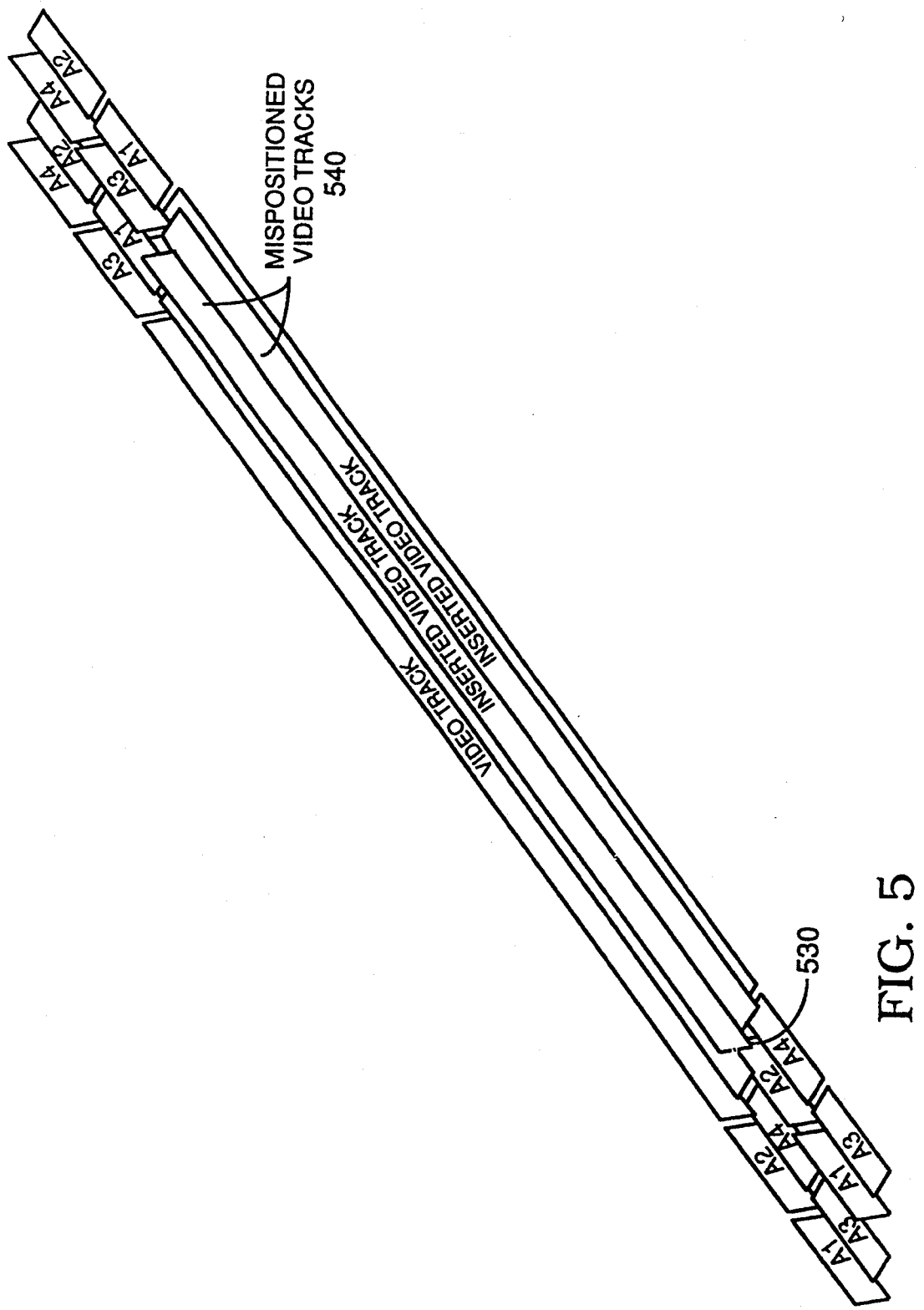
FIG. 5 illustrates a plurality of video tracks and audio channels, as written on a magnetic tape like in FIG. 4 except that the video tracks are misaligned, and is useful in illustrating the principles of our invention.

Referring to a single channel structure illustrated in FIG. 1, an automatic scan tracking playback head 112 reads a magnetic tape 110, which can be like magnetic tape 400 shown in FIGS. 4, 5 and 6, and supplies a playback signal, via a cable 114, to a playback amplifier 116 having a fixed gain circuit 118. See, for example, U.S. Pat. No. 4,151,570 issued Apr. 24, 1979 for more information about automatic scan tracking. An output of the amplifier 116 is supplied to a head switch 120 via a cable 134. Switching of the head switch 120 is provided by means of a head switch control signal which corresponds to the video vertical rate signal and which is provided on a control cable 122.

A record head 124 supplies a playback signal to a variable gain amplifier 128 via a mode switch 126. The mode switch 126 includes a record mode contact and an edit play mode contact, with the edit play mode contact being coupled to the variable gain amplifier 128. The record contact is coupled to the output of a conventional record amplifier 127 which supplies the record head 124 with a video record signal via a cable 129, for example, as when performing an insert edit function after the edit optimization function has been completed. An output of the variable gain amplifier 128 is supplied to the head switch 120 via a cable 136.

An output of the head switch 120 is coupled to a low pass filter 132, and thence to a linear detector circuit, which may be any of various linear detectors such as an average value detector, a root mean squared (RMS) detector or a peak level detector 130, such as is illustrated here. The cutoff frequency of the low pass filter 132 is selected to make the frequency response of the playback head channel match the frequency response of the record head channel. Thus, any difference between the output signals from the heads is not due to differences in the head properties or head characteristics. It may be seen that the input to the peak level detector 130 is either the amplified and filtered signal from the playback head 112 or the amplified and filtered signal from the record head 124, depending upon which position the head switch 120 is switched to via the vertical rate control signal on control cable 122. An output of peak level detector 130 comprises a pair of signals corresponding to the peak rf amplitudes of the playback head 112 and of the record head 124, which are coupled via a cable 140 to an analog-to-digital (A/D) converter 138, and thence to a suitably programmed microprocessor 142 via a cable 144. The microprocessor 142 manipulates the two peak rf amplitudes to provide a correction signal corresponding to the inverse of the difference between the two peak rf amplitudes. The correction signal 146, which is a measure of pattern sensitivity, is supplied to the variable gain amplifier 128 via a cable 146 and a digital-to-analog (D/A) converter 148 to vary the gain of the amplifier 128 and to thereby remove the effects of the pattern sensitivity. Thus it may be seen that the A/D converter 138, the microprocessor 142 and the D/A converter 148 comprise, in effect, a feedback loop 150 which supplies the correction signal to variable gain amplifier 128 to normalize the gain in the record head channel, thereby removing the effects of pattern sensitivity. Thus the signal available from the variable gain amplifier 128 is due to tracking variations alone, and a value indicative of the corresponding control track position is stored via the microprocessor to provide precise tracking of the record head during the edit optimization function and prior to the actual edit function. Note that longitudinal control track head 170 can read control track position signals from the magnetic tape in accord with the D2 format and extend those signals through control track playback circuits 175 for providing longitudinal position information to microprocessor 142.

Figure 2:
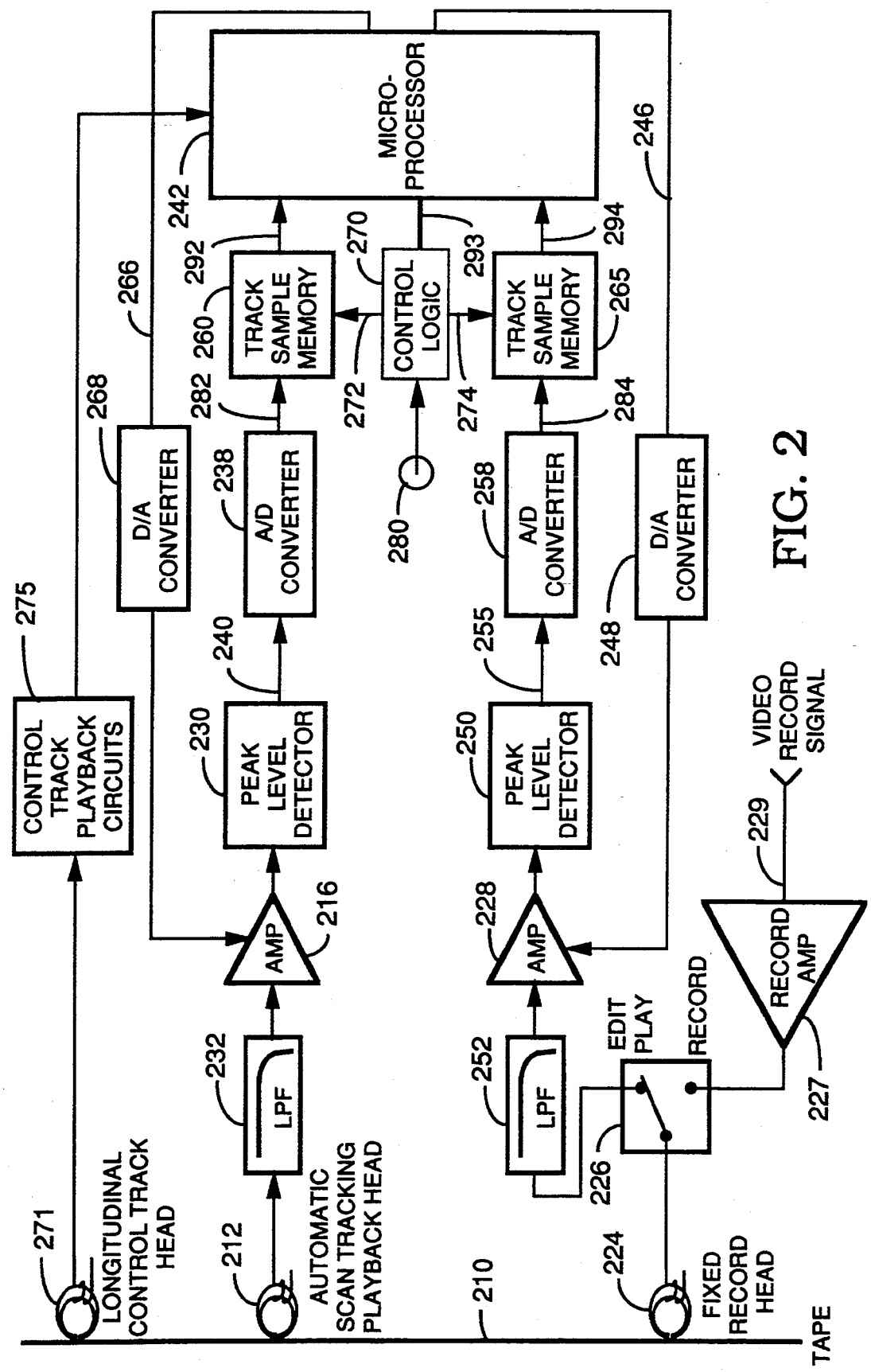
FIG. 2 is a block diagram depicting a two channel embodiment of circuitry for effecting the automatic edit optimize process of the invention.

Refer now to a two channel approach illustrated in FIG. 2.

In the first channel, an automatic scan tracking playback head 212 reads a magnetic tape 210, which can be like magnetic tape 400 shown in FIGS. 4, 5 and 6 or magnetic tape 110 shown in FIG. 1, and supplies a playback signal through a low pass filter 232 to a variable gain playback amplifier 216. The cutoff frequency of low pass filter 232 is selected to make the frequency response of the first, or playback head, channel match the frequency response of the second, or record head, channel, which is later described. Thus, any difference between the output signals from the heads is not due to differences in the head properties or head characteristics. An output of the variable gain amplifier 216 is supplied to a linear detector circuit, which may be any of various linear detectors such as an average value detector, a root mean squared (RMS) detector or a peak level detector 230, such as is illustrated here. An output of peak level detector 230 comprises a signal corresponding to the peak rf amplitude of the playback head 212, which is coupled via a cable 240 to an A/D converter 238, and thence over cable 282 through a track sample memory 260 to a suitably programmed microprocessor 242 over cable 292.

In the second channel, a record head 224 supplies a playback signal to a low pass filter 252 via a mode switch 226. The mode switch 226 includes a record mode contact and an edit play mode contact, with the edit play mode contact being coupled to the low pass filter 252. The record contact is coupled to the output of a conventional record amplifier 227 which supplies the record head 224 with a video record signal via a cable 229, for example, as when performing an edit function after the edit optimization function is complete. An output from low pass filter 252 is coupled to an input of variable gain amplifier 228. An output of variable gain amplifier 228 is supplied to another linear detector circuit, which may be any of various linear detectors such as an average value detector, a root mean squared (RMS) detector or a peak level detector 250, such as is illustrated here. An output of peak level detector 250 comprises a signal corresponding to the peak rf amplitude of the record head 224, which is coupled via a cable 255 to an A/D converter 258, and thence over cable 284 through track sample memory 265 to a suitably programmed microprocessor 242 over cable 294.

Thus it may be seen that the first channel including peak level detector 230, A/D converter 238, and track sample memory 260 provides a first rf amplitude signal to the microprocessor 242 while the second channel including peak level detector 250, A/D converter 258, and track sample memory 265 provides a second rf amplitude signal to the microprocessor 242. The microprocessor 242 manipulates the two peak rf amplitudes to provide appropriate correction signals respectively to variable gain amplifiers 216 and 228, thereby, responsive to the two correction signals, obtaining a separate, independent and distinct gain control in each of the two channels. The track sample memories 260 and 265 are responsive to head switch signals, scanner tach signals, and timing signals (here illustratively a four MHz timing signal) provided over cable 280 to control logic 270, for storing and multiplexing the respective rf amplitude signals to microprocessor 242. Thus the rf signals generated in the first channel can be used to adjust the gain control of amplifier 216 of the first channel and can also be used to normalize the record head rf amplitude signals with the playback head rf amplitude signals by adjusting the gain control of amplifier 228 in the second channel. The rf signals generated in the second channel can be used to adjust the tracking of the record head 224, for example, by automatically positioning tape 210 with respect to helical record head 224, all in response to the control signals from microprocessor 242, and to thereby perform an edit optimize that subsequently precisely locates the record head with respect to a track of the storage medium during an edit process.

Note that a longitudinal control track head 271 can read control track position signals from the magnetic tape in accordance with the D2 format and extend those signals through control track playback circuits 275 for providing longitudinal position information to microprocessor 242.

Figure 3:
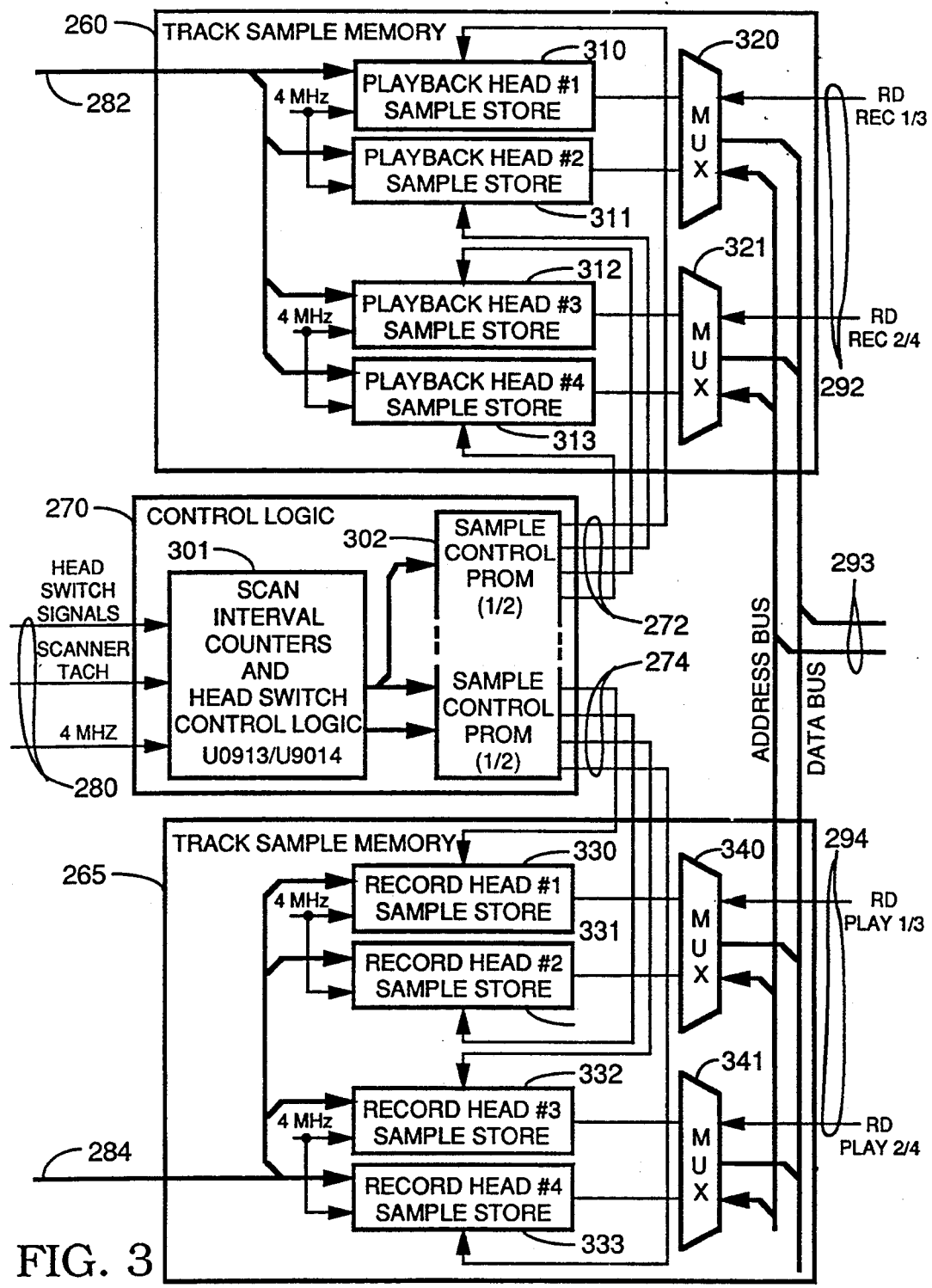
FIG. 3 is a block diagram depicting in further detail portions of the circuitry of FIG. 2.

Turning now to FIG. 3, there is exemplified control logic 270 and track sample memories 260 and 265. The respective sample memories can be substantially identical for processing the respective first and the second rf amplitude signals. Therefore, the following discussion can be limited to one track sample memory, recognizing that the other track sample memory is substantially identical. However, before the detailed description of those elements a brief incite into the sampling philosophy and theory appears to be in order.

Tape recorders using the D2 format typically include four record heads and four playback heads, which are grouped in pairs for reading and writing four tracks of magnetic tape. Typically each pair is electrically situated so that a playback head can read a track before the record head writes that same track. Sometimes such an arrangement is called "read before write" in the art. Typically there is a delay circuit in a read-before-write recorder so that the track that is read can be processed by the recorder in some designed manner before it is written, sometimes rewritten with old data and sometimes written with new data. For our purposes, on the one hand, edit optimization is more concerned with the location of the data on the storage medium and less concerned about the content of the stored information. On the other hand, the insert edit function, which typically occurs after the edit optimization, is typically more concerned about the content of the information to be written on the storage medium and less concerned about the location on the storage medium at which the information will be written. This makes sense when it is recognized that the edit optimization function occurs first and is useful in the process of identifying where the insert edit function will later write the information.

Also, the edit optimization function can occur more precisely because the sampling rate of the storage medium is increased. This makes sense when it is recognized that a higher sampling rate can result in more data points being made available to be processed in determining a more precise location on the storage medium. Further, the edit optimization function can occur more precisely because each pair of playback and record heads reads the same track. Fortuitously, with the two channel approach now being discussed not only are four tracks of magnetic tape being read but two heads on each track do the reading, all at a faster sampling rate. The data thusly generated can be processed by microprocessor 242 to provide more precise correction signals to more precisely locate the tracks on the tape and to more precisely position the heads over the tracks, which greatly improves the edit optimization function. In response to the increased precision, it is possible to, for example, (a) more precisely align a track and/or a head during the edit optimize and prior to an insert edit function writing data on the storage medium; or (b) more precisely measure the geometrical shape of the track, for example, to measure exactly how straight a track may be on a magnetic tape, which, for the VPR® 300 D2 composite digital format video tape recorder manufactured by Ampex Corporation, can be part of a process known as a helical scan tracking check; or (c) more precisely measure the record head or playback head coplanarity among the plurality of record heads or among the plurality of playback heads, here of four record heads or of four playback heads; or (d) more precisely verify the operation of the record head, which is typically used only in recording but is here used both for recording and for playback.

Regarding the sampling rate, it may be noted that a scanner tach signal may be provided by scanner circuitry, which is not part of the present invention, as a reference sampling signal. As mentioned earlier, each track on the magnetic tape can include a plurality of blocks of video information where each block includes a video track and two audio channels which are recorded twice with identical data being written on the tape at alternate ends of adjacent video tracks. Responsive to the reference sampling signal, each block on a track may be sampled eight times—one time for each of the two leading audio channels, four times for the video track, and one time for each of the two trailing audio channels. Note that this emphasizes again the large amount of data that can be collected to more precisely perform an edit optimize. Here, each video block is sampled eight times by each of that track's playback head and record head, which gives rise to 16 samples per block, which in turn gives rise to 64 samples across the width of the four tracks of one scanner. Note further that the video track and the audio channels are sampled separately and accordingly the data samples may be processed independently by microprocessor 242. In that manner, and referring to the earlier discussion of FIGS. 4, 5 and 6, mispositioned video tracks and mispositioned audio channels can be processed independently and optimized independently, as required, for example, using the read before write process, which was discussed earlier. In view of that teaching, note that a track can, if desired, be rewritten in its entirety or some segments of the track can be rewritten and other segments left intact, etc. Choices can be displayed to the operator on a display panel and selections may be made by the operator—all these increased possibilities flowing from the more precise edit optimization that is possible in accordance with the principles of our invention.

Head switch signals, scanner tach signals, and a four MHz timing signal can be provided by other recorder circuitry, which is not part of the invention, over cable 280 to control logic 270 and therein through counter 301 to control PROM 302. Responsive to PROM 302 signals over cable 272, the respective first rf amplitude signals from the respective four playback heads, as provided over cable 282, are stored in playback head sample stores 310, 311, 312 and 313 of track sample memory 260. Thereafter and responsive to enable signals over cable 292 from microprocessor 242 to multiplexors 320 and 321, the first respective rf amplitude signals can be provided from the respective sample stores over cable 293 to the microprocessor for edit optimization processing. Similarly, responsive to PROM 302 signals over cable 274, the respective second rf amplitude signals from the respective four record heads, as provided over cable 284, are stored in record head sample stores 330, 331, 332 and 333 of track sample memory 265. Thereafter and responsive to enable signals over cable 294 from microprocessor 242 to multiplexors 340 and 341, the second respective rf amplitude signals can be provided from the respective sample stores over cable 293 to the microprocessor for edit optimization processing.

Microprocessor 242, as mentioned earlier, can be suitably programmed to perform the edit optimization function. Appendix A includes a source code listing in the C++ programming language for performing the sampling of the rf amplitude signals and for removing the pattern sensitivity. Appendix B includes a source code listing in the C++ programming language for reading the processed data from the program represented by the code in Appendix A and for performing the edit optimization and for providing the correction signals to variable gain amplifiers 216 and 228.

The foregoing description of the principles of our invention is by way of illustration only and not by way of limitation. For example, although several illustrative embodiments of edit optimize system and method in accordance with the principles of our invention have been shown and described, other alternative embodiments are possible and would be clear to one skilled in the art upon an understanding of the principles of my invention. Certainly the principles of my invention have utility apart from edit optimizing video signals. For example, the edit optimization of any signal, for example, the edit optimization of a plurality of graphics image signals or computer data files or analog concert music, could benefit from the application of the principles of our invention. Accordingly, the scope of our invention is to be limited only by the appended claims.

Appendix A

```
/***************************************************************
 *                                                             *
 *     Copyright 1990, and 1991 Ampex Corporation.             *
 *                  All rights reserved.                       *
 *                                                             *
 *                                                             *
 *                                                             *
 *                                                             *
 *                                                             *
 *                                                             *
 *                                                             *
 *                                                             *
 ***************************************************************/

/*
 *
 * Auto edit optimize subroutines
 * This module handles the sampling of the rf
 *
 */ void
rf_channels_class::rf_sampling_mode_action_sink_method()
{
    if (!auto_edit_optimize_hardware_is_present) return;
    // Hit everything to nominal
    EQHP->eqhw_rec_hd_playback_gain = current_rec_gain = EQHW_head_gain_nominal;
    EQHP->eqhw_rec_hd_playback_offset = EQHW_head_offset_nominal;
    EQHP->eqhw_ast_hd_playback_gain = current_ast_gain = EQHW_head_gain_nominal;
    EQHP->eqhw_ast_hd_playback_offset = EQHW_head_offset_nominal;
} void
rf_channels_class::EditOptimizeRF_at_color_frame_of_reference(void)
{
    if (!auto_edit_optimize_hardware_is_present) return;
    if ((color_frame_of_reference_data_sink.value & 0x3) != 1) {
        // Sample once per color frame
        return;
    }
    strobe_count++;
    EQHP->eqhw_color_frame_strobe = 0;
} void
rf_channels_class::EditOptimizeRF_at_servo_reference(void)
{
    int i;
    volatile byte *ast_sample_hw_ptr;
    byte *rec_sample_array;
    byte sample;
    int *net_level_channel_ptr;
    int *first_head, *second_head;
```

```
    int scaled_sample, metered_value, new_mean;
    byte is_channel_A;

// Do nothing if not needed
    if (!auto_edit_optimize_hardware_is_present) return;
    if (rf_sampling_mode_action_sink.value == rf_sampling_mode_off) {
    return;
}

// Sample waiting data
if (EQHP->eqhw_status & EQHW_aeo_rec_channel_B_samples_availible) {
    // Read rec channel B samples
    for(i=0; i < 16; i++) {
        previous_rec_channel_B_samples[i] =
          EQHP->eqhw_rec_hd_ch_b_read_ctl[i];
    }
} else {
    // Read rec channel A samples
    for(i=0; i < 16; i++) {
        previous_rec_channel_A_samples[i] =
          EQHP->eqhw_rec_hd_ch_a_read_ctl[i];
    }
}

// Now sum up the new ast data
// Determine which hw to compare against which stored data
if (EQHP->eqhw_status & EQHW_aeo_ast_channel_B_samples_availible) {
    // Got ast channel B samples
    ast_sample_hw_ptr = EQHP->eqhw_ast_hd_ch_b_read_ctl;
    rec_sample_array = previous_rec_channel_B_samples;
    net_level_channel_ptr = &net_level_B;
    first_head = &rf_head_amplitude_data_source.value.head_4;
    second_head = &rf_head_amplitude_data_source.value.head_2;
    is_channel_A = 0;
} else {
    // Got ast channel A samples
    ast_sample_hw_ptr = EQHP->eqhw_ast_hd_ch_a_read_ctl;
    rec_sample_array = previous_rec_channel_A_samples;
    net_level_channel_ptr = &net_level_A;
    first_head = &rf_head_amplitude_data_source.value.head_3;
    second_head = &rf_head_amplitude_data_source.value.head_1;
    is_channel_A = 1;
}
// Collect the hw info and scale based on stored info
ast_level = 0;
rec_level = 0;
net_level = 0;
*first_head = 0;
*second_head = 0;
for(i=0; i < 16; i++) { sample = ast_sample_hw_ptr[i];
    rec_level += rec_sample_array[i];

if (sample != 0) {
        ast_level += sample;
        // Scale new data with respect to the record head
        // And sum up
        scaled_sample = ((int)rec_sample_array[i] * 0x100) / sample;
        net_level += scaled_sample;

switch(rf_head_amplitude_metering_data_sink.value) {
        case head_select_playback:
            metered_value = sample;
            break;
        case head_select_record:
            metered_value = rec_sample_array[i];
            break;
        default:
        case head_select_auto:
                metered_value = scaled_sample;
                break;
        } if (i < 8) {
```

```
                *first_head += metered_value;
            } else {
                *second_head += metered_value;
            }
        }
    };
    *net_level_channel_ptr = net_level;

// Set up for next time, if needed
    switch(rf_sampling_mode_action_sink.value) {
    case rf_sampling_mode_gain_and_offset:
        // Not implemented
        break;
    case rf_sampling_mode_gain:
        // Try to center the rf about 128 on the ADC
#define TOLERABLE_WIDTH 32
        if (ast_level < (128-TOLERABLE_WIDTH)*16 &&
            current_ast_gain < 255) {
            // Pump up the volume
            current_rec_gain = ++current_ast_gain;
            EQHP->eqhw_rec_hd_playback_gain = current_rec_gain;
            EQHP->eqhw_ast_hd_playback_gain = current_ast_gain;
        } else if (ast_level > (128+TOLERABLE_WIDTH)*16
                && current_ast_gain > 2) {
            // Turn the volume down
            current_rec_gain = --current_ast_gain;
            EQHP->eqhw_rec_hd_playback_gain = current_rec_gain;
            EQHP->eqhw_ast_hd_playback_gain = current_ast_gain;
        }
        break;
    default:
        // Do nothing in all other modes
        break;
    }

// Return the current amplitude to the world
    // DONT DO TOO OFTEN!
    if (is_channel_A) {
        new_mean =
            rf_head_amplitude_data_source.value.head_1
          + rf_head_amplitude_data_source.value.head_2
          + rf_head_amplitude_data_source.value.head_3
          + rf_head_amplitude_data_source.value.head_4;
        rf_head_amplitude_data_source.value.head_mean =
            (rf_head_amplitude_data_source.value.head_mean / 4) * 3
          + (new_mean / 4);
        rf_head_amplitude_data_source.send();
        rf_head_amplitude_mean_data_source = new_mean;
    }
}
```

Appendix B

```
/****************************************************************
 *                                                              *
 *      Copyright 1990, and 1991 Ampex Corporation.             *
 *                   All rights reserved.                       *
 *                                                              *
 *                                                              *
 *                                                              *
 *                                                              *
 *                                                              *
 *                                                         :    *
 *                                                              *
 *                                                     :        *
 ****************************************************************/

/**** Edit optmize data structure ****/
typedef enum {
    direction_up,
    direction_down,
    direction_none
} DirectionEnum;

typedef enum {
    edopt_start,
    edopt_select,
    edopt_wait_for_up,
    edopt_wait_for_up_sampling,
    edopt_wait_for_down,
    edopt_wait_for_down_sampling
} edopt_enum;

class EditOptimizeClass {
    // This class provides a clean interface
    // for the auto edit algorithms.
    // Unfortunately, this class and the auto tracker
    // use each other
    // Too bad.
    class auto_tracker_class *the_auto_tracker;
    edopt_enum state;
    DirectionEnum direction;
    byte measuring_lepulse;
    int center;
    int stepsize;
    short tracking_stability_count;
    byte tracking_is_stable;
    short samples_taken;
    long int net_sampling;
    short duration_of_movement;
    long int up_sampling_coefficient;
    long int down_sampling_coefficient;
    int timeout;
    int dither_count;
    int end_stability_count;
    int end_when_ready;
    int lp_measured_small, lp_measured_large, lp_measured_ok;

// Adjustable "constants" -- can only be adjusted via ad_tool
    // Should be actual constants when we ship
    int DITHER_COUNT, DITHER_SIZE, SAMPLES_PER_POSITION, MINIMUM_STEPSIZE;
    int ENDING_STABILITY;

// Called when we have waitied too long for a new tracking position
    void DoTrackingTimeout(void);
    void TellCenter(void);

// Internal routine used to set tracking
    // Cooperates with the tracking lock detection
    // routine
    void set_tracking(long position);
```

```
// Determine if tracking is stable
// Result goes into var 'tracking is stable'
void CheckTrackingStability(void);

// Turn rf sampling sink off
void SuspendSampling(void);

// Turn rf sampling sink on
// and prepare to collect some samples
void InitiateSampling(void);

// Reset lepulse measurements for re-sampling
void ResetLepulseMeasurement(void);
// Collect, lepulse measurements made
int WhereIsLepulse(void);

void TellStatus(autotrack_status_enum status);
void DeclareDone(void);

// A routine that checks the current optimization center and, if we decide
// that there is a legitimate tracking position closer to the nominal
// tracking position than our current position is, we will jump to the
// closer tracking position
void limit_center(void);

public:
    // Offset from peak rf to be used for recording
    int offset_from_peak_tracking;
    // Inter-track distance to be used when jumping
    // from a track with a bad lepulse timing to the correct
    // track
    int track_width;
    // Field width tolerance is distance we will tolerate away from 0 tracking
    // Field width is distance between fields
    int field_width, field_width_tolerance;

// Samples taken of the rf amplitude received by the auto tracker should be
    // funneled to this function.  The value passed is the mean of the samples
    // along the current track modified to eliminate pattern sensitivity
    void TakeSample(int sample);

// Called to turn off the edit optimize algorithm abruptly
    void Off(void);
    // Called to begin edit optimizing
    void Start(void);
    // Called at vertical during the edit optimize
    void Run(void);

// Function to be called whenever a lepulse timing comes in
    // during an edit optimize.  We use this to make sure we are tracking on the
    // correct segment.
    void LepulseTiming(long timing);

// Function to be called whenever a new cassette is present in the transport
    void NewCassetteInjected(void);

// Way of registering this class with parent object
    void RegisterParent(class auto_tracker_class *parent);

EditOptimizeClass(void);
};

/*****************************/
/**** Edit Optimize Class ****/
/*****************************/

// Number of samples to take at each
// stable control track position
//#define SAMPLES_PER_POSITION 3

// Initial movement size to use when you have a
// tape with a completetely unknown tracking position
#define INITIAL_SEEKSIZE 1024
```

```
// Minimum allowed seeksize when redoing optimize on a tape
#define MINIMUM_RESTART_SEEKSIZE 128

// Spread on either side of center to sniff to decide
// in which direction the peak is
//#define DITHER_SIZE 128

// The minimum stepsize to be used when seeking the peak
//#define MINIMUM_STEPSIZE 16

// The maximum stepsize to be used when seeking the peak
#define MAXIMUM_STEPSIZE 2048

// If auto optimize is suspended while the seeksize is
// greater than this value, we will cause an optimize failure message
// to show up
#define NECCESSARY_SEEKSIZE 256

// The error that will be tolerated when the ct is stable
#define TRACKING_ERROR_TOLERANCE 250

// The length of time ct must appear stable before we're
// convinced it is stable
#define CONTROL_TRACK_STABLE_TIME 3

// The length of time we will wait for tracking to
// get to a desired position (1 sec)
#define TRACKING_TIMEOUT 30

EditOptimizeClass::EditOptimizeClass(void)
{
    // offset for 525 systems
    offset_from_peak_tracking = 214 * 2;
    track_width = 11122;
    field_width = track_width * 3;
    field_width_tolerance = track_width * 2;

measuring_lepulse = 0;
    DITHER_COUNT = 1;
    DITHER_SIZE = 128;
    SAMPLES_PER_POSITION = 3;
    MINIMUM_STEPSIZE = 1;
    end_stability_count = 0;
    ENDING_STABILITY = 3;
    end_when_ready = 1;
    NewCassetteInjected();
} void EditOptimizeClass::NewCassetteInjected(void)
{
    center = 0;
    stepsize = INITIAL_SEEKSIZE;
} void EditOptimizeClass::RegisterParent(class auto_tracker_class *parent)
{
    the_auto_tracker = parent;
} void EditOptimizeClass::set_tracking(long position)
{
    the_auto_tracker->control_track_position(position);
    tracking_stability_count = 0;
} void EditOptimizeClass::CheckTrackingStability(void)
{
    long tracking_error
        = the_auto_tracker->control_track_position_error_data_sink.value;

// Bomb if we are out of range
    if (ABS(tracking_error) > TRACKING_ERROR_TOLERANCE) {
        tracking_is_stable = 0;
        tracking_stability_count = 0;
        return;
    }
```

```
    // Be content if we've been happy long enough
    if (tracking_stability_count >= CONTROL_TRACK_STABLE_TIME) {
        tracking_is_stable = 1;
        return;
    }

// Be happier
    tracking_stability_count++;
}

/*
 * Sampling of rf:
 * These next routines allow the edit optimize sequence to sit at one position
 * and sample for a little while before going on.
 * When the sequence is ready to sample, it calls initiate sampling.
 * The auto tracker provides the samples to us through the take sample routine.
 * The suspend sampling routine stops the sampling (for any reason).
 * The take sample routine will automatically stop the sampling and run the
 * optimizer when enough samples have been taken
 */ void EditOptimizeClass::SuspendSampling(void)
{
    the_auto_tracker->rf_head_amplitude_mean_data_sink.deactivate();
} void EditOptimizeClass::InitiateSampling(void)
{
    the_auto_tracker->
        rf_head_amplitude_mean_data_sink.activate_silently();
    samples_taken = 0;
    net_sampling = 0;
} void EditOptimizeClass::TakeSample(int sample)
{
    samples_taken++;
    net_sampling += sample;
    if (samples_taken >= SAMPLES_PER_POSITION) {
        SuspendSampling();
        Run();
    }
} void EditOptimizeClass::Off(void)
{
    the_auto_tracker->at_substate = 0;
    state = edopt_start;
} void EditOptimizeClass::TellCenter(void)
{
    the_auto_tracker->current_edit_optimize_tracking_position_data_source =
        center;
} void EditOptimizeClass::Start(void)
{
    the_auto_tracker->at_state = 2; // Go into the run state
    set_tracking(center);
    end_stability_count = 0;
    state = edopt_start;
    // Start the first round
    Run();
} void EditOptimizeClass::TellStatus(autotrack_status_enum status)
{
    the_auto_tracker->autotrack_status_data_source = status;
} void EditOptimizeClass::DoTrackingTimeout(void)
{
```

```
        // Just try re-tracking to a higher position
        center += 2000;   // Up by 1000usec
        limit_center();
} void EditOptimizeClass::DeclareDone(void)
{
    TellStatus(autotrack_status_done);
    set_tracking(center-offset_from_peak_tracking);
    the_auto_tracker->at_state = 3; // Done
} void EditOptimizeClass::LepulseTiming(long timing)
{
    // Lepulses from the wrong segment are usually multiples of
    // 5000 usec away from the 0 usec.
    // Thus, we will assume the lepulse is wrong if lepulse is more
    // then 2500 usec (5000 units) away from zero.
    int half_field_width = field_width / 2;
    int half_track_width = track_width / 2;

// Correct timing if more than one field out
    // Fails if more than two fields out
    if (timing > half_field_width) {
        timing -= field_width;
        if (timing > half_field_width) {
            timing -= field_width;
            if (timing > half_field_width) return;
        }
    }
    if (timing < -half_field_width) {
        timing += field_width;
        if (timing < -half_field_width) {
            timing += field_width;
            if (timing < -half_field_width) return;
        }
    } if (measuring_lepulse) {
        if (timing < -half_track_width) {
            lp_measured_small++;
        } else if (timing > half_track_width) {
            lp_measured_large++;
        } else {
            lp_measured_ok++;
        }
    }
} void EditOptimizeClass::ResetLepulseMeasurement(void)
{
    measuring_lepulse = 1;
    lp_measured_small = lp_measured_large = lp_measured_ok = 0;
} int EditOptimizeClass::WhereIsLepulse(void)
{
    measuring_lepulse = 0;
    if (lp_measured_large > lp_measured_small + lp_measured_ok) {
        // If we saw a large lepulse timing the majority of the time
        // then worry
        return 1;
    } else if (lp_measured_small > lp_measured_large + lp_measured_ok) {
        // If we saw a small lepulse timing the majority of the time
        // then worry
        return -1;
    }
    // Otherwise be happy
    return 0;
} void EditOptimizeClass::limit_center(void)
{
    // Make sure center doesn't do too far
    if (center > field_width_tolerance) {
        center -= field_width;
    } else if (center < -field_width_tolerance) {
```

```
        center += field_width;
    }
} void EditOptimizeClass::Run(void)
{
    switch(state) {
    case edopt_start:
        //.Wait for control track stability
        // Out primary responsibilty is to get to the correct tracking
        CheckTrackingStability();
        if (!tracking_is_stable) break;
        state = edopt_select;
        // Fall through if (stepsize < MIMIMUM_RESTART_SEEKSIZE) {
            stepsize = MIMIMUM_RESTART_SEEKSIZE;
        } case edopt_select:
Ledopt_select:
        down_sampling_coefficient = up_sampling_coefficient = 0;
        dither_count = DITHER_COUNT;
Lcontinue_dither:
        // Select a new tracking position
        // Test the up side
        set_tracking(center + DITHER_SIZE);
        state = edopt_wait_for_up;
        timeout = 0;
        break;

case edopt_wait_for_up:
        // Dont wait too long for rf
        if (++timeout > TRACKING_TIMEOUT) {
            DoTrackingTimeout();
            goto Ledopt_select;
        }

// Wait for tracking to staBilize
        CheckTrackingStability();
        if (!tracking_is_stable) break;
        timeout = 0;

// When we reach the up position
        // start sampling
        InitiateSampling();
        state = edopt_wait_for_up_sampling;
        break;

case edopt_wait_for_up_sampling:
        // We get out of here via the sampler function
        if (samples_taken < SAMPLES_PER_POSITION) break;

// Register sampling
        up_sampling_coefficient += net_sampling;

// Move tracking to down position
        set_tracking(center - DITHER_SIZE);
        state = edopt_wait_for_down;
        timeout = 0;
        break;

case edopt_wait_for_down:
        // Dont wait too long for rf
        if (++timeout > TRACKING_TIMEOUT) {
            DoTrackingTimeout();
            goto Ledopt_select;
        }

// Wait for tracking to stabilize
        CheckTrackingStability();
        if (!tracking_is_stable) break;
        timeout = 0;
```

```
    // Start looking at lepulse
    ResetLepulseMeasurement();

// When we reach the down position
    // start sampling
    InitiateSampling();
    state = edopt_wait_for_down_sampling;
    break;

case edopt_wait_for_down_sampling:
    // We get out of here via the sampler function
    if (samples_taken < SAMPLES_PER_POSITION) break;

// If we are on the wrong track, rectify the situation
    switch(WhereIsLepulse()) {
    case -1:
        // Need to go to new track
        center += track_width;
        limit_center();
        goto Ledopt_select;
    case 1:
        // Need to go to new track
        center -= track_width;
        limit_center();
        goto Ledopt_select;
    case 0:
    default:
        ;
        // We're on the right track!
    }

// Register sampling
    down_sampling_coefficient += net_sampling;

// Select a new direction to move in
    DirectionEnum new_direction;
    if (up_sampling_coefficient > down_sampling_coefficient) {
        new_direction = direction_up;
    } else {
        new_direction = direction_down;
    }

// Should we dither some more?
    if (--dither_count > 0) {
        goto Lcontinue_dither;
    }

// Determine how well we're doing...
    // ... should we change our velocity ...
    if (new_direction != direction) {
        if (direction != direction_none) {
            // We must have successfully passed the peak,
            // Slow down the seek velocity
            if (stepsize > MINIMUM_STEPSIZE) {
                end_stability_count = 0;
                stepsize >>= 1;
            } else {
                // This is good enough, declare victory
                // and retreat
                if (++end_stability_count >= ENDING_STABILITY
                  && end_when_ready) {
                    DeclareDone();
                    return;
                }
            }
        }
        direction = new_direction;
        duration_of_movement = 0;
    } else {
        duration_of_movement++;
        if (duration_of_movement > 3) {
            end_stability_count = 0;
            // We seem to have lost sight of our goal...
            // Speed up the seek
```

```
        if (stepsize < MAXIMUM_STEPSIZE) {
            stepsize <<= 1;
        }
        duration_of_movement = 0;
    }
}

// Now take the new step
if (direction == direction_up) {
    center += stepsize;
} else {
    center -= stepsize;
}
limit_center();
TellCenter();

// Take another sample
goto Ledopt_select;
    }
}
```

What is claimed is:

1. A circuit for providing automatic edit optimization of a recording in a storage medium, the storage medium operable with a recorder, the recorder having a helical record head and an automatic scan tracking helical playback head, wherein there are variations in a stored data pattern on the storage medium which cause mistracking, comprising:

first means including the record head for generating a signal having amplitude fluctuations due to said variations and also due to mistracking of the record head;

second means including the automatic scan tracking playback head for generating a signal having amplitude fluctuations due only to the variations in the stored data patterns, said first and second means including means responsive to the generated signals for distinguishing between the amplitude fluctuations caused by said variations and the amplitude fluctuations caused by said mistracking; and means responsive to the means for distinguishing for adjusting subsequently the tracking of the record head in accordance with the generated signals.

2. The circuit of claim 1 wherein the automatic scan tracking playback head supplies a playback head playback signal and the record head supplies a record head playback signal, wherein the distinguishing means includes:

detector means for providing the generated signals in the form of a pair of peak rf signals representative of the amplitudes of the playback head playback signal and the record head playback signal.

3. The circuit of claim 2 wherein:

the first and second means include switch means receiving said pair of peak rf signals, for alternately supplying the rf signals to the detector means; and the adjusting means includes microprocessor means for generating, in response to the pair of peak rf signals, a correction signal indicative of the variations in the stored data patterns.

4. The circuit of claim 3 wherein the adjusting means further comprises:

means responsive to the playback head rf signal and to the record head rf signal for spectrally matching the two rf signals.

5. A circuit for providing automatic edit optimization of a recording in a storage medium, the storage medium operable with a recorder, the recorder having a record head and an automatic scan tracking playback head, wherein there are variations in a stored data pattern on the storage medium which cause mistracking of the record head, comprising:

first means including the record head and second means including the automatic scan tracking playback head for generating signals indicative of the variations in the stored data patterns and also for distinguishing between rf amplitude fluctuations caused by pattern sensitivity and rf amplitude fluctuations caused by tracking;

wherein the recorder is adapted via the automatic scan tracking playback head to supply a playback head rf signal and via the record head to supply a record head rf signal;

wherein the first and the second generating means include;

detector means for providing the generated signals in the form of a pair of alternating peak rf signals representative of the respective amplitudes of the playback head rf signal and the record head rf signal;

adjusting means including microprocessor means for generating, in response to the pair of alternating peak rf signals, a correction signal indicative of the variations in the stored data patterns and for adjusting the tracking of the record head in a subsequent recording process; and wherein the first and second means further includes;

switch means receiving the automatic scan tracking playback head rf signal and the record head rf signal for alternately supplying the rf signals to the detector means.

6. The circuit of claim 5 further comprising:

means for switchably operating the switch means at a head switching rate related to a video vertical rate.

7. The circuit of claim 5 wherein the adjusting means further comprises:

amplifier means coupled between the record head and an input of the detector means and having a variable gain which is varied in response to the correction signal to cancel the mistracking due to the data pattern variations.

8. The circuit of claim 7 wherein the adjusting means further comprises:

converter means for supplying the correction signal from the microprocessor means to the amplifier means; and wherein the microprocessor means includes;

memory means for storing a tracking signal corresponding to the correction signal.

9. A circuit for providing automatic edit optimization of a recording in a recording medium being operable with a recorder, the recorder having a record head playback signal and an automatically scan tracked playback head playback signal, wherein pattern sensitivity and attendant record head mistracking are caused by variations in stored data patterns on the medium, the circuit comprising:

switch means for alternately supplying the playback head playback signal and the record head playback signal in response to a predetermined rate signal;

detector means responsive to the switch means for generating respective peak signals indicative of the playback head playback signal and the record head playback signal;

microprocessor means receiving the peak signals for distinguishing between rf amplitude fluctuations in the playback head playback signal caused only by pattern sensitivity and rf amplitude fluctuations in the record head playback signal caused by both pattern sensitivity and by mistracking, and for generating a correction signal indicative of the pattern sensitivity; and means responsive to the correction signal for adjusting the gain imparted to the record head playback signal to remove the amplitude fluctuations due to pattern sensitivity.

10. The circuit of claim 9 further comprising filter means for receiving and for spectrally matching the two playback signals.

11. The circuit of claim 10 wherein the spectrally matching means is a low pass filter and the adjusting means is a variable gain amplifier.

12. The circuit of claim 9 wherein the detector means is a linear signal detecting means such as level detector, an average value detector or an RMS detector.

13. The circuit of claim 9 further comprising:

an analog-to-digital converter responsive to the playback head playback signal and the record head playback signal for supplying the peak rf signals to the microprocessor means; and a digital-to-analog converter coupled to the microprocessor means for supplying the correction signal to the gain adjusting means.

14. A method for providing edit optimization of a recording in a recorder having a helical playback head and a helical record head, wherein there are variations in a data pattern of an associated recorded signal which cause mistracking of the record head, the method comprising the steps of:

generating a playback head playback signal having amplitude fluctuations due to said variations;

generating a record head playback signal having amplitude fluctuations due to said variations and due to the mistracking;

detecting a pair of signals corresponding respectively to the record head playback signal and the playback head playback signal;

determining a correction signal in response to the detected pair of signals which distinguishes between amplitude fluctuations caused by the variations in the data pattern and amplitude fluctuations caused by the mistracking; and adjusting the tracking of the record head in response to the correction signal until the record head playback signal peaks.

15. The method of claim 14 including:
spectrally matching the playback head playback signal with the record head playback signal.

16. The method of claim 14 wherein the determining step includes:
detecting a difference between the amplitude fluctuations of the playback head playback signal and the record head playback signal; and
generating the correction signal in response to the difference.

17. The method of claim 14 wherein the step of generating the playback head playback signal comprises:
supplying the playback head playback signal via an automatic scan tracking playback head;
and wherein the method further comprises the step of:
responsive to the playback head playback signal, positioning the playback head to precisely track while it is playing back.

18. The method of claim 14 wherein the recorder includes a control track circuit and wherein the adjusting step comprises the steps of:
varying a reference signal to the control track circuit until the record head playback signal peaks; and
storing the corresponding correction signal for use in positioning the record head.

19. The method of claim 14 wherein the adjusting step comprises the step of:
normalizing the gain of the record head playback signal in response to the correction signal.

20. A system for providing automatic edit optimization of a recording in a storage medium being operable with a recorder, the recorder having a helical record head which experiences customary mistracking, and an automatic scan tracking helical playback head, there being variations in data patterns that are recorded on the storage medium which cause further mistracking of the record head, the system comprising:

means for differentiating between record head signal fluctuations due to combined mistracking and playback head signal fluctuations due to variations in the recorded data patterns;

means responsive to the differentiated signal fluctuations for generating a correction signal indicative of only the variations in the data patterns; and means responsive to the correction signal for positioning the record head relative to the storage medium to subsequently perform the optimized edit recording.

21. The system of claim 20 wherein the automatic scan tracking playback head supplies a playback head playback signal and wherein the record head supplies a record head playback signal; and wherein the differentiating means includes;

means for distinguishing between the playback head playback signal amplitude fluctuations that are caused by the data pattern variations and the record head playback signal amplitude fluctuations that are caused by the customary and further mistracking;

wherein the generating means includes microprocessor means for providing said correction signal in response to said distinguishing means; and wherein the positioning means includes;

means responsive to the microprocessor means for properly tracking the record head when subsequently performing the optimized edit recording.

* * * * *